Figure 1:
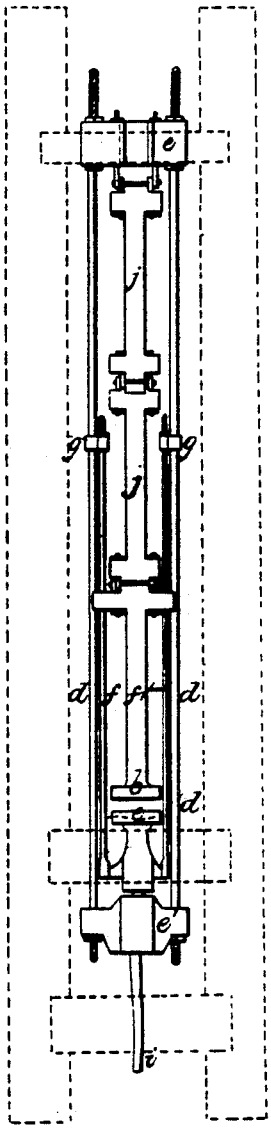
Figure 2:
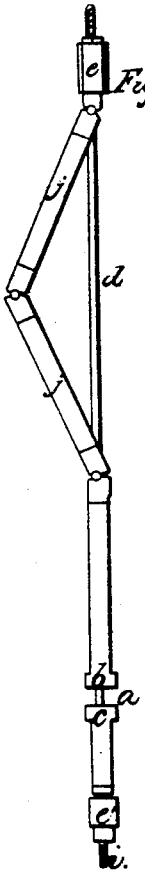

NO PRINTED SPECIFICATION AVAILABLE
BEST AVAILABLE COPY

N. Sawyer,

Brick Machine.

No. 10. A.I. Patented Aug. 13, 1838.

AM. PHOTO-LITHO. CO. N.Y. (OSBORNE'S PROCESS)